(12) United States Patent
Murphy

(10) Patent No.: US 6,463,559 B1
(45) Date of Patent: Oct. 8, 2002

(54) NON-VOLATILE FAULT INDICATOR

(75) Inventor: Brian Francis Murphy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,451

(22) Filed: Jun. 30, 1999

(51) Int. Cl.$^7$ .............................................. G01R 31/28
(52) U.S. Cl. ...................... 714/724; 714/733
(58) Field of Search ............................ 710/62, 61, 60; 714/710, 724, 742, 733; 360/31

(56) References Cited

U.S. PATENT DOCUMENTS

| | | | |
|---|---|---|---|
| 4,024,498 A | 5/1977 | McIntosh | 340/146.1 |
| RE34,100 E | 10/1992 | Hartness | 371/40.1 |
| 5,331,476 A | 7/1994 | Fry et al. | 360/53 |
| 5,416,760 A | 5/1995 | Masood et al. | 369/47 |
| 5,572,661 A | 11/1996 | Jacobson | 395/182.05 |
| 5,590,134 A | 12/1996 | Yin | 371/21.5 |
| 5,659,801 A * | 8/1997 | Kopsaftis | 710/62 |
| 5,717,697 A | 2/1998 | Yin | 371/21.5 |
| 5,717,952 A | 2/1998 | Christiansen et al. | 395/842 |
| 5,737,371 A | 4/1998 | Jaquette | 375/357 |
| 6,018,778 A * | 1/2000 | Stolowitz | 710/61 |
| 6,141,779 A * | 10/2000 | Hill et al. | 714/710 |
| 6,208,477 B1 * | 3/2001 | Cloke et al. | 360/31 |
| 6,237,052 B1 * | 5/2001 | Stolowitz | 710/61 |

OTHER PUBLICATIONS

Fiorino, B.C., Larsen, L.; Dead–Track Error Correction; IBM® Technical Disclosure Bulletin; vol. 21, No. 4, Sep. 1978.

* cited by examiner

Primary Examiner—David Ton
(74) Attorney, Agent, or Firm—Joseph P. Lally; Mark E. McBurney

(57) ABSTRACT

A device such as a tape drive or disk drive unit and a computer system that incorporates the device in which he device preferably includes a controller or processor and a non-volatile storage element configured with microcode suitable for execution by the controller. In an embodiment suitable for use in the computer system, the controller is preferably configured for communicating with a peripheral bus of a computer system via a bus interface unit. The device further includes a non-volatile fault indicator and fault logic suitable for detecting a fault condition in the device. The fault logic is adapted to program the non-volatile fault indicator upon detecting a fault condition to preserve the occurrence of the fault. In this manner, both repeatable and intermittent fault conditions are documented for subsequent servicing by a service engineer.

17 Claims, 3 Drawing Sheets

NON-VOLATILE FAULT INDICATOR

BACKGROUND

1. Field of the Present Invention

The present invention generally relates to fault detection in computer systems and more particularly to a method and system for detecting and addressing intermittent and other fault conditions that are difficult to detect or reproduce.

2. History of Related Art

Electronic devices are susceptible to a wide variety of conditions that may result in the generation of an error code or fault condition. The complexity of sophisticated electronic devices including computer systems can make the task of identifying and addressing fault conditions extremely difficult. Computer system users who have initially encountered a condition that generates an error code, error message, or other fault condition are frequently unable to reliably reproduce the condition in the presence of a customer service engineer. When the service engineer is unable to replicate a fault condition, the engineer will either assume that the user caused the condition or that the condition is not longer affecting operation. In either event, the service engineer is unable to address the problem and both the user and the service engineer are left unsatisfied. Moreover, the service engineer will frequently have to revisit the system when the fault condition reappears. The service process described is slow and costly and causes customer dissatisfaction. Thus, it is highly desirable to provide a mechanism by which a service engineer can objectively verify that an error or fault condition has occurred. It is further desirable that the implemented solution be economical and compatible, to the extent possible, with existing systems.

SUMMARY OF THE INVENTION

The problems identified above are in large part addressed by incorporation of a fault detection mechanism into the electronic device. The fault detection mechanism is adapted to record the occurrence of a fault condition and to preserve the record until the fault condition is repaired or otherwise eliminated. Broadly speaking, the invention contemplates a device such as a tape drive or disk drive unit and a computer system that incorporates the device. The device preferably includes a controller or processor and a non-volatile storage element configured with microcode suitable for execution by the controller. In an embodiment suitable for use in the computer system, the controller is preferably configured for communicating with a peripheral bus of a computer system via a bus interface unit. The device further includes a non-volatile fault indicator and fault logic suitable for detecting a fault condition in the device. The fault logic is adapted to program the non-volatile fault indicator upon detecting a fault condition to preserve the occurrence of the fault. In this manner, both repeatable and intermittent fault conditions are documented for subsequent servicing by a service engineer.

The programming of the fault indicator preferably occurs as a portion of a fault recovery routine executed by the device in response to the detection of the fault condition. In one embodiment, once the fault indicator has been programmed, it is erased, cleared, or otherwise reset only when the component of the device associated with the fault indicator has been replaced. The fault condition that triggers the programming of the fault indicator is a condition that would cause a diagnostic program appropriate for the device to indicate a failure. The fault indicator is preferably read as part of the diagnostic program and, if programmed, the fault indicator causes the diagnostic program to indicate that a failure has occurred. In one embodiment, the fault indicator comprises a portion of the non-volatile storage element such that only a single non-volatile device is required. One embodiment of the invention includes multiple additional non-volatile fault indicators, where each of the non-volatile fault indicators is associated with a corresponding component of the device.

The invention further contemplates a method of recording the occurrence of fault conditions in which the internal logic of a device is exercised and a fault condition in the device is detected. In response to the detection of the fault condition, the occurrence of the fault condition is recorded by programming a non-volatile fault indicator of the device to preserve the occurrence of both intermittent and permanent fault conditions. The internal logic may be exercised during normal operation by a user of the device or computer system or by execution of a device diagnostic routine or program by a service technician. The diagnostic program preferably includes a step of reading the fault indicator and, if the fault indicator is programmed, indicating that a failure has occurred such that the diagnostic program will continue to indicate the failure until the fault indicator has been cleared. In an embodiment in which the fault indicator comprises a portion of the system's non-volatile storage element or boot code device, the step of setting the fault indicator is accomplished by programming one or more bits of the non-volatile storage element.

BRIEF DESCRIPTION OF THE DRAWINGS

Other objects and advantages of the invention will become apparent upon reading the following detailed description and upon reference to the accompanying drawings in which.

Figure 1:
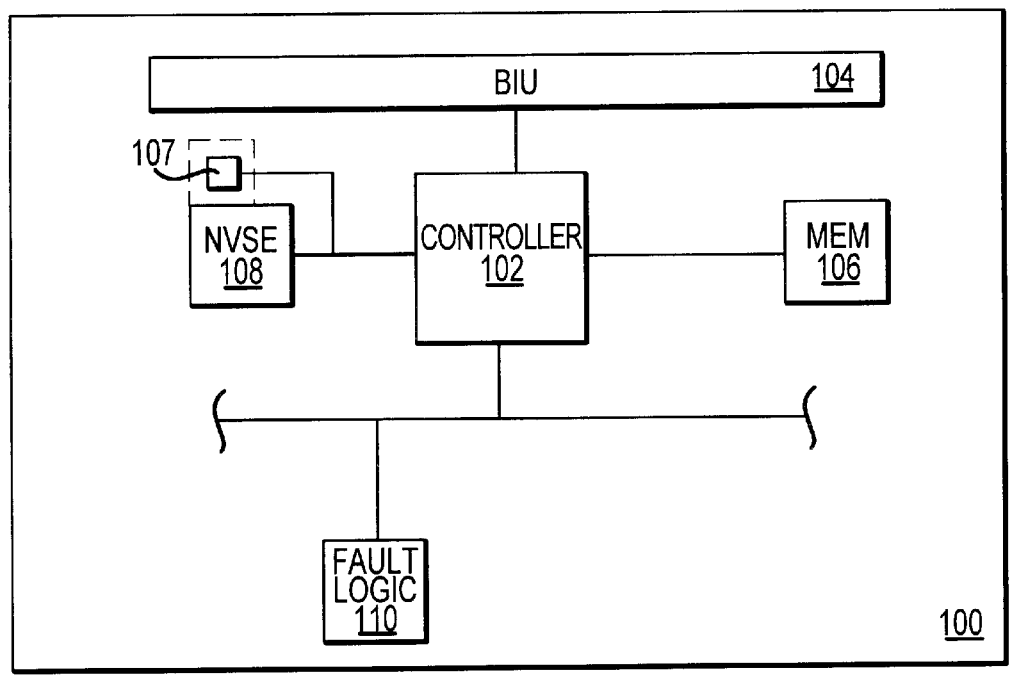
FIG. 1 is simplified block diagram of a device according to one embodiment of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 depicts an electronic device 100 according to one embodiment of the invention. In the depicted embodiment, device 100 includes a microprocessor or controller unit 102 responsible for controlling the operation of device 100. In the depicted embodiment, suitable for use in a computer system, controller 102 is coupled to a bus interface unit 104. The bus interface unit 104 is adapted to communicate with a peripheral or I/O bus of a computer system (described in greater detail below). Controller 102 operates under the device's microcode, which is preferably stored in a non-volatile storage element 108. The microcode includes as a sequence of microprocessor instructions suitable for execution by controller 102. Non-volatile storage element 108 comprises any of a variety of non-volatile memory devices that are designed to retain their data or other information between power tenures. In the preferred embodiment, non-volatile storage element 108 is implemented as a flash memory module desirable for its programmability as well as its non-volatility. Programmable non-volatile storage devices are typically required for microcode applications to enable relatively easy updating of the microcode when new revisions of the code are released. In the depicted embodiment, device 100 may include local random access memory array 106 that is accessible to controller 102.

Device 100 according to the depicted embodiment further includes fault detection logic indicated in FIG. 1 by reference numeral 110. As implied by its name, fault logic 110 is adapted to detect the occurrence of any of a variety of fault conditions that may occur during operation of device 100. In the preferred embodiment, fault detection logic 110 is adapted to initiate an error recovery sequence if a fault is detected to attempt to address the fault condition and to continue operation of the device 100 if appropriate. The fault logic 110 and other internal logic (not explicitly indicated in FIG. 1) of device 100 is coupled to the controller 102.

Device 100 further includes a fault indicator 107. Fault indicator 107 is a non-volatile storage element dedicated to the purpose of recording fault conditions in device 100 as they occur. Preserving or documenting the occurrence of fault conditions can beneficially simplify field maintenance of device 100 by providing objective evidence of the occurrence of a fault condition. As will be appreciated by essentially any user of electronic equipment in general and computer systems in particular, errors or other fault conditions can occur for a variety of reasons. In some cases, a fault or error condition is associated with a particular user input or keyboard sequence. This is particularly true if the system is running sophisticated or complex software that may not be robust enough to manage a particular input sequence. Other fault conditions, which may originate in system hardware, may be transient in nature such that it is difficult to reliably reproduce the fault condition so that an appropriate service engineer or technician can address the problem. Thus, it is frequently difficult for a service engineer to determine the source of a reported fault condition because of the difficulty in reproducing the condition. The present invention address this issue by providing a permanent record of a fault condition that occurs so that the service engineer who is responsible for maintaining the system has an objectively verifiable record of the occurrence of the fault condition.

As indicated above, fault logic 110 detects the occurrence of fault conditions that occur in device 100. Fault logic 110 is further adapted to program or otherwise set fault indicator 107 upon detecting a fault condition during operation of device 100. The detection of the fault condition by fault logic 110 may occur during normal system operation or during the execution of a diagnostic routine by a service engineer. In the preferred embodiment, device 100 and fault logic 110 are configured to respond to the detection of a fault condition by executing an error recovery sequence. The error recovery sequence may comprise a software routine stored in non-volatile storage device 108 or in the device's local memory 106. In the preferred embodiment, the error recovery sequence includes setting or otherwise programming fault indicator 107 to document the occurrence of the fault condition. In all other respects, the error recovery routine is unaffected by the presence of fault indicator 107 and the recovery routine proceeds as it otherwise would. This greatly simplifies the process of introducing fault indicator 107 into an existing environment. In the preferred embodiment, the setting of fault indicator 107 occurs regardless of whether the error recovery sequence is able to address that condition that caused the fault. Preferably, fault conditions that trigger the setting of fault indicator 107 include any error, condition, or state that would cause the device's diagnostic program to indicate a failure.

Figure 2:
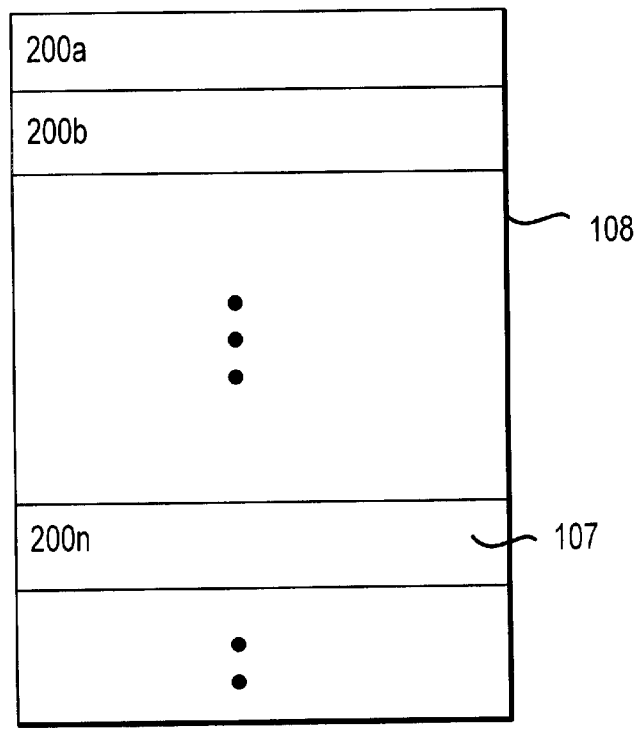
FIG. 2 is a representation of a non-volatile storage element.

In the simplest embodiment, fault indicator 107 comprises a single bit that indicates simply whether any fault condition has occurred. In other arrangements, fault indicator 107 may comprise multiple non-volatile storage bits capable of indicating whether particular components of device 100 caused a fault condition. In one desirable arrangement, fault indicator 107 comprises a portion of non-volatile storage element 108. (This embodiment is implied in FIG. 1 by the dotted line surrounding fault indicator 107). Turning briefly to FIG. 2, an embodiment of non-volatile storage element 108 is represented. In this embodiment, non-volatile storage element 108 is implemented as a flash memory module that includes a set of sectors identified in FIG. 2 by reference numerals 200a . . . 200n, etc (collectively or generically referred to herein as sectors 200). Sectors 200 of a flash memory module are capable of being independently erased. With this arrangement, fault indicator 107 may occupy one or more bits of a dedicated flash memory sector such as, for example, sector 200n while the microcode for device 100 occupies remaining sectors. Because it requires only a single non-volatile storage device, this embodiment is desirable for its economy and ease of implementation.

After fault indicator 107 has been set, the preferred embodiment of the invention contemplates that the indicator can only be reset by replacing the device component responsible for the fault condition. When maintenance is next performed on the system after a fault condition occurs, a service engineer will execute a diagnostic routine. The diagnostic program contemplated for use with the present invention preferably includes a sequence in which the fault indicator 107 is read. If the fault indicator has been programmed or otherwise set, the diagnostic program indicates a failure even if all other diagnostic tests pass. This situation may occur, for example, if device 100 has a transient fault condition that appears intermittently, but is unable to be reproduced in the presence of a service engineer. In this manner, the preferred embodiment of the invention mandates the repair or replacement of any component that has generated a fault condition, whether the fault condition represents a recurring condition or a transient condition. In addition, the diagnostic routine itself may cause the internal logic of device 100 to generate a fault condition, in which case the diagnostic routine would indicate the failure thereby necessitating replacement or repair of the fault causing component or components (or possibly requiring replacement of the entire device 100).

Figure 3:
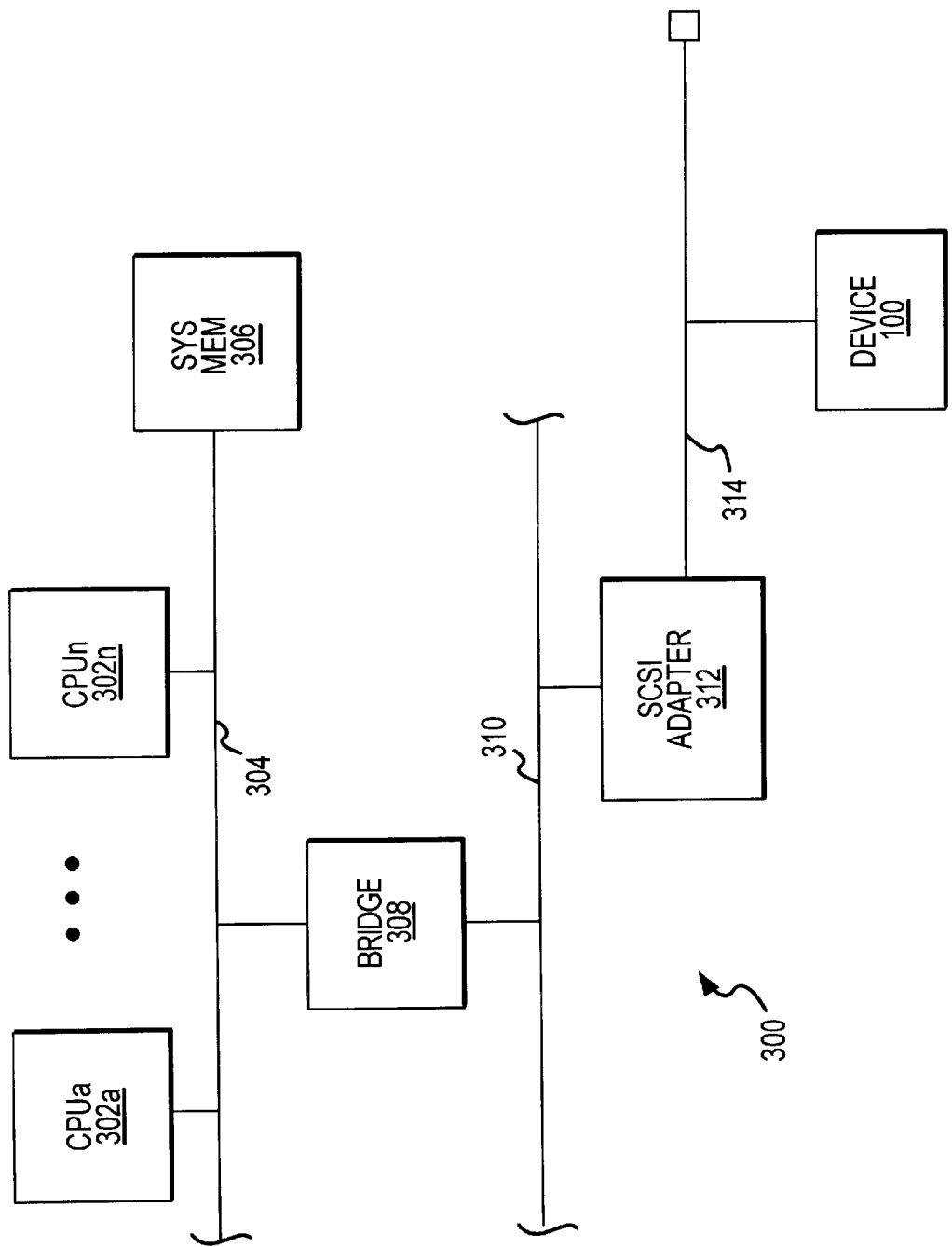
FIG. 3 is a simplified block diagram of a computer system.

Turning now to FIG. 3, a computer system 300 incorporating the fault indicator 107 is shown. The depicted embodiment of the computer system 300 includes one or more central processing units 302a . . . 302n (collectively identified as CPU's 302) coupled to a host bus 304. A system memory 306 is accessible to CPU's 302 via the host bus. An intermediate memory controller unit (not shown) may included between system memory 306 and host bus 304. Alternatively, the memory control function may be integrated into each CPU 302. A bus bridge 308 is coupled between host bus 304 and a peripheral or I/O bus 310.

Peripheral bus 310 may comply with any of a variety of standard bus architectures including, as examples, the PCI, AGP, MCA, ISA, and EISA architectures. One or more peripheral devices or adapters may be connected to peripheral bus 310. In the depicted embodiment, a SCSI adapter is connected to peripheral bus 310 to provide a SCSI bus 314 suitable for use with a variety of data storage peripherals. In the depicted embodiment, device 100 is connected to SCSI bus 314. In this embodiment, device 100 may comprise a hard disk controller or another mass storage device such as a tape drive unit. As described previously, device 100 includes fault indicator 107 and fault logic 110 to document and preserve fault conditions caused by device 100 to achieve the benefits described herein.

Figure 4:
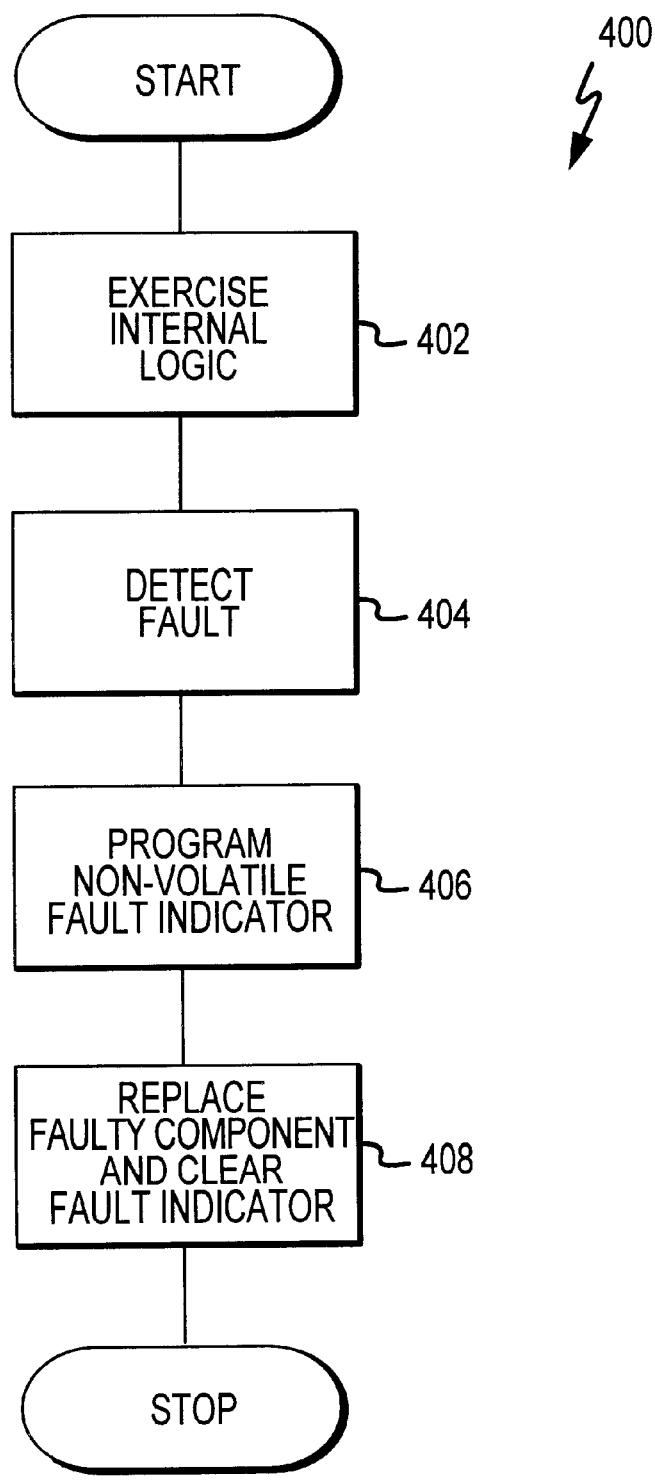
FIG. 4 is a flow diagram of a method of according to one embodiment of the invention.

Turning now to FIG. 4, a flow diagram depicting a method 400 of documenting the occurrence of fault conditions in an electronic device is shown. In the depicted flow diagram, internal logic of the device is exercised (step 402) and a fault is detected (step 404). In response to the detection of the fault, a non-volatile fault indicator is programmed or otherwise set (step 406). The fault indicator preferably remains set until the condition that caused the fault is determined and replaced or repaired (step 408) regardless of whether an error correction routine of the device is able to address the fault condition and regardless of whether the fault condition continues to persist. In this manner, method 400 according to the invention insures that fault generating conditions are detected and eliminated in the shortest possible time to improve overall system quality, reduce service costs by minimizing repetitive service calls, and increase customer satisfaction.

It will be apparent to those skilled in the art having the benefit of this disclosure that the present invention contemplates the detection, documentation and repair of fault generation conditions in an electronic device. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A peripheral device suitable for use in a microprocessor-based data processing system, comprising:
   a device controller;
   a non-volatile storage element configured with microcode suitable for execution by the controller and a non-volatile fault indicator;
   fault logic adapted to initiate an error recovery in response to detection of an intermittent fault condition, wherein the error recovery sequence is configured to set unconditionally the non-volatile fault indicator to document the occurrence of the intermittent fault.

2. The device of claim 1, wherein the non-volatile storage element comprises a flash memory card having a plurality of independently erasable sectors and wherein the non-volatile fault indicator occupies its own sector.

3. The device of claim 1, wherein the non-volatile fault indicator, once programmed, is cleared only by replacing a component of the device associated with the non-volatile fault indicator.

4. The device of claim 1, wherein the fault condition that triggers the programming of the non-volatile fault indicator comprises any condition that would cause a device diagnostic program to indicate a failure.

5. The device of claim 4, wherein the non-volatile fault indicator is read as part of the diagnostic program and, if programmed, causes the diagnostic program to indicate a failure.

6. The device of claim 1, further comprising multiple additional non-volatile fault indicators, wherein each of the non-volatile fault indicators is associated with a corresponding component of the device.

7. The device of claim 1, further comprising a bus interface unit coupled to the controller and suitable for providing a communication path between the controller and the data processing system.

8. A computer system comprising:
   a central processing unit;
   a system memory coupled to the central processing unit via a host bus;
   a bus bridge connected between the host bus and a peripheral bus; and
   a peripheral device connected to the peripheral bus wherein the peripheral device includes:
      a bus interface unit suitable for providing communication path with the peripheral bus;
      a peripheral device controller;
      a non-volatile storage element configured with peripheral device microcode suitable for execution by the controller and a non-volatile fault indicator;
      fault logic adapted to initiate an error recovery in response to detection of an intermittent fault condition, wherein the error recovery sequence is configured to set unconditionally the non-volatile fault indicator to document the occurrence of the intermittent fault.

9. The computer system of claim 8, wherein the non-volatile storage element comprises a flash memory card having a plurality of independently erasable sectors and wherein the non-volatile fault indicator occupies its own sector.

10. The computer system of claim 8, wherein the non-volatile fault indicator is indicative of a fault in a particular component of the peripheral device.

11. The computer system of claim 10, wherein the non-volatile fault indicator is cleared only by replacing the component indicated by the non-volatile fault indicator.

12. The computer system of claim 8, wherein the fault condition that triggers the programming of the non-volatile fault indicator comprises a condition that would cause a peripheral device diagnostic program to indicate a failure.

13. The computer system of claim 12, wherein the non-volatile fault indicator is read as part of the diagnostic program.

14. The computer system of claim 13, wherein the non-volatile fault indicator, when programmed, causes the diagnostic program to indicate a failure.

15. The computer system claim 8, wherein the bus interface unit is suitable for communicating with a SCSI compliant bus.

16. The computer system of claim 8, wherein the peripheral component comprises a tape drive unit of the component system.

17. The computer system of claim 8, further comprising multiple additional non-volatile fault indicators, wherein each of the additional non-volatile fault indicators is associated with a corresponding component of the peripheral device.

* * * * *